June 19, 1928.  1,673,894
F. R. WASSERKAMPF
POINTER TELEGRAPH
Filed June 17, 1924
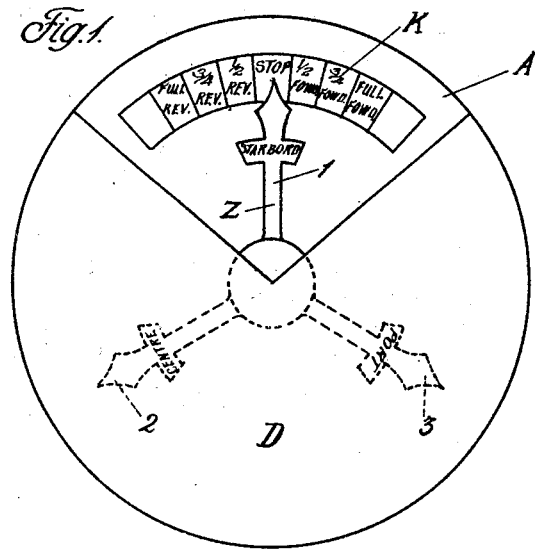
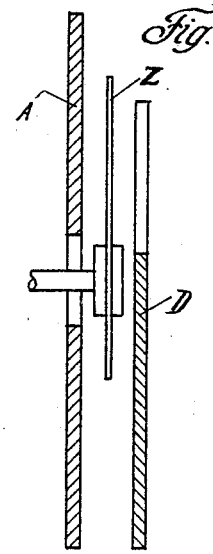
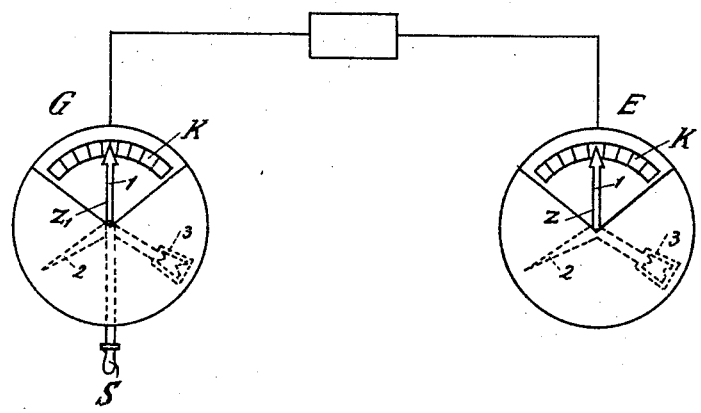
Inventor
Friedrich Rudolf Wasserkampf
by Knight Bros
Attorneys

Patented June 19, 1928. 1,673,894

UNITED STATES PATENT OFFICE.

FRIEDRICH RUDOLF WASSERKAMPF, OF KIEL, GERMANY, ASSIGNOR TO THE FIRM: NEUFELDT & KUHNKE BETRIEBSGESELLSCHAFT M. B. H., OF KIEL, GERMANY.

POINTER TELEGRAPH.

Application filed June 17, 1924, Serial No. 720,677, and in Germany May 21, 1923.

My invention relates to signalling devices such as are used for instance for transmitting signals between a ship's bridge and the engine room and its purpose is to facilitate the transmission of signals from the bridge intended for a plurality of machine units of the same character, for instance, a plurality of ship's engines.

At the present day, in order to transmit signals to several ship's engines, as many individual signalling systems are used as there are engines. This has the disadvantage that firstly, the cost of such a multiple signalling plant is great; secondly, a considerable amount of space is required which is particularly inconvenient on the bridge; thirdly, the operation is complicated because as many individual control levers must be operated, one for each engine unit controlled.

For the same character of units to be controlled, for instance three ship's engines, the same signal characters are required, such for example as "stop", "half speed ahead" or the like, so that where the units controlled are closely adjacent to each other, one signal character scale might serve for all units controlled provided the individual units are properly identified on the scale.

To accomplish this purpose according to the present invention, I propose to use a circular scale, which however encompasses only a portion of the periphery, for instance slightly less than 120° for controlling three engines, and to employ correspondingly three hands, set at an angle of 120° against each other on the same indicator shaft, so that only one hand at a time can register with the scale. I further propose to obscure from view all but the one hand registering with the scale at the time, in other words I only render that sector of the dial visible, which embraces the scale, so that the observer is not disturbed by the movement of the other hands.

The invention is illustrated in the accompanying drawings, in which—

Fig. 1 represents the face view of an indicator dial according to the present invention;

Fig. 2 represents a central vertical section through Fig. 1 and

Fig. 3 represents a transmitter and receiver station.

It may be pointed out at the outset, that for the present invention it is immaterial in what manner the signals are transmitted from the transmitter to the receiver, i. e. whether mechanically, electrically or in any other conventional manner, so long as the hands at the transmitter and receiver move in synchronism, which may be accomplished by any of the expedients well known in this art. Therefore the line connection between the transmitter G and the receiver E in Fig. 3 is meant to indicate that these two elements are suitably connected to cause synchronous operation of their respective indicator shafts.

In Fig. 1 Z is a pointer having in three arms 1, 2 and 3, which are disposed at angles of 120 degrees. These arms are enlarged near the upper end to allow space for different legends indicating the pertaining control objects as shown. The scale K on the dial A embraces nearly an angle of 120 degrees and contains the several signals as shown. A cover-plate D is placed over the dial A and the pointer Z. Through an opening in this plate only the scale K is to be seen, the cover-plate covering the pointer-arms, not registering with the scale.

In Fig. 3 G represents the transmitter and E the receiver. The dials and pointers of both devices are constructed alike, except that the pointer group Z' of the transmitter is provided with a hand lever S by which any of the three pointers can be set on any portion of the scale. As stated hereinbefore the transmitter and receiver pointers are assumed to rotate in synchronism, so that if for instance lever S is operated to move its pointer 2, which may represent the center engine of a set of three ship's engines, onto the center of the scale which may bear the signal "Stop", pointer 2 of the receiver E will appear in the field of the receiver scale and assume a similar portion on the scale, which indicates to the engineer that control for the central engine is signalled.

What I claim as my invention is:

1. In a pointer telegraph system having similar transmitter and receiver elements, and an indicator in each element operating in synchronism with that of the other element, each indicator having a plurality of pointers set at similar angles to each other, a dial on each element having a scale representing a plurality of different signal characters and embracing an angle smaller than the angle between adjacent pointers, so that only one pointer at a time is able to move within the angular range of the scale and to indicate any of said signal characters desired, each pointer representing a different control object.

2. In a pointer telegraph system having similar transmitter and receiver elements, and an indicator in each element operating in synchronism with that of the other element, each indicator having a plurality of pointers set at similar angles to each other, a dial on each element having a scale representing a plurality of different signal characters and embracing an angle smaller than the angle between adjacent pointers, so that only one pointer at a time is able to move within the angular range of the scale and to indicate any of said signal characters desired, each pointer representing a different control object, and a cover plate for said dial covering the pointers of the indicator except the one registering with the scale.

FRIEDRICH RUDOLF WASSERKAMPF.